(12) United States Patent
Nowatzki et al.

(10) Patent No.: US 6,594,689 B1
(45) Date of Patent: Jul. 15, 2003

(54) MULTI-PLATFORM HELPER UTILITIES

(75) Inventors: Thomas L. Nowatzki, Shoreview, MN (US); Barry R. Ruzek, Shoreview, MN (US); Sylvia M. Wilhelmi, Prior Lake, MN (US); Loren R. Lennie, Vadnais Heights, MN (US)

(73) Assignee: Unisys Corporation, Blue Bell, PA (US)

( * ) Notice: Subject to any disclaimer, the term of this patent is extended or adjusted under 35 U.S.C. 154(b) by 1002 days.

(21) Appl. No.: 08/852,660

(22) Filed: May 8, 1997

(51) Int. Cl.$^7$ .............................. G06F 15/16; G06F 9/54
(52) U.S. Cl. ...................... 709/208; 709/229; 709/246; 709/319; 709/320; 709/101
(58) Field of Search .................................. 709/304, 302, 709/220, 208, 227, 229, 246, 320, 319, 101

(56) References Cited

U.S. PATENT DOCUMENTS

| | | | | |
|---|---|---|---|---|
| 5,497,463 A | * | 3/1996 | Stein et al. .................. | 709/304 |
| 5,581,670 A | | 12/1996 | Bier et al. ................... | 395/326 |
| 5,581,684 A | | 12/1996 | Dudzik et al. ............... | 395/338 |
| 5,581,686 A | | 12/1996 | Koppolu et al. ............. | 395/340 |
| 5,584,035 A | | 12/1996 | Duggan et al. .............. | 395/800 |
| 5,604,896 A | * | 2/1997 | Duxbury et al. ............. | 709/227 |
| 5,754,830 A | * | 5/1998 | Butts et al. .................. | 709/203 |
| 5,778,228 A | * | 7/1998 | Wei .............................. | 709/219 |

OTHER PUBLICATIONS

Microsoft Word for Windows 95, Version 7.0, Copyright 1983–1995 Microsoft Corporation.
Micron Help, Version 1.1G, Copyright 1996, Micron Electronics, Inc.
Microsoft Windows 95, Copyright 1981–1995, Microsoft Corporation.

* cited by examiner

*Primary Examiner*—Dung C. Dinh
(74) *Attorney, Agent, or Firm*—Charles A. Johnson; Mark T. Starr; Nawrocki, Rooney & Sivertson, P.A.

(57) ABSTRACT

Method and apparatus for directly accessing data from, or submit runs to, another computer platform. Preferably, this is accomplished by providing a special program statement within the software code of a computer program that is executed on a local computer platform. The special program statement may include a remote request, and may call a utility that formats and sends the remote request to the desired remote computer platform. After the remote request has been processed by the desired remote computer platform, resulting data preferably is returned to the computer program on the local computer platform.

24 Claims, 12 Drawing Sheets

MULTI-PLATFORM HELPER UTILITIES

CROSS REFERENCE TO CO-PENDING APPLICATIONS

The present application is related to U.S. patent application Ser. No. 08/852,507, filed May 7, 1997, entitled "Operator Assistance for Heterogenous Data Processing Systems", and U.S. patent application Ser. No. 08/852,509, filed May 7, 1997 now U.S. Pat. No. 5,917,485, entitled "Operator Assistance for Data Processing Systems", both of which are assigned to the assignee of the present invention and which are all incorporated herein by reference..

BACKGROUND OF THE INVENTION

1. Field of the Invention

The present invention relates generally to data processing systems, and more particularly to such systems that provide communication between heterogeneous computer platforms.

2. Description of the Prior Art

It is known in the prior art to interconnect various computer platforms to form:larger distributed data processing systems. For example, personal computers may be coupled together via a Local Area Network (LAN) or some other form of connection. In another example, a number of personal computers may be coupled to a mainframe type computer system. In this latter example, the personal computers may exercise control over and submit execution runs to the mainframe computer. This approach may allow a user of a personal computer to execute smaller tasks directly on the personal computer, and submitted larger tasks to the mainframe computer.

To take full advantage of the capabilities of interconnected computer platforms, it would be desirable to have computer programs that can execute across multiple computer platforms. For example, it would be desirable if a computer program operating on a personal computer could directly access data from, or submit runs to, another computer platform.

It has been recognized that to write such computer programs, a user must typically have detailed knowledge in the communications protocols for each of the involved computer platforms. This may include a detailed knowledge of the network connection of each computer platform, as well as the communication protocols used therebetween.

A further difficulty is that each time a new platform is interconnected to the existing platforms, any such computer program may have to be updated with new communication protocols. This is made even more difficult when heterogenous computer platforms having different hardware and software architectures are used.

SUMMARY OF THE INVENTION

The present invention overcomes many of the disadvantages associated with the prior art by providing a method and apparatus for directly accessing data from, or submit runs to, another computer platform. Preferably, this is accomplished by providing a special program statement within the software code of a computer program that is executed on a local computer platform. The special program statement may include a remote request, and may call a utility that formats and sends the remote request to the desired remote computer platform. The utility may support requests to one or more computer platforms, and may support one or more communication protocols. After the remote request has been processed by the desired remote computer platform, resulting data may be returned to the computer program on the local computer platform.

As can readily be seen, the present invention may allow a computer program executing on a local computer platform to execute runs or perform other tasks on a remote computer platform. This may be particularly useful when, for example, the computer program is being executed on a personal computer, and the personal computer is interconnected to a remote mainframe type computer system. The personal computer may perform many of the tasks specified by the computer program, without using any of the resources of the remote mainframe computer. However, when large and/or complex tasks are required, the computer program may be coded to submit those tasks to the remote mainframe computer system. This may save a significant amount of processing time, and may optimize the use of available resources.

In a first embodiment, the request is provided by an application program resident on a first computer platform. The request is formatted into a format that is compatible with a second computer platform. Once formatted, the request is provided to the second computer platform, which then process the request. A result is then provided to the first computer platform, if appropriate, wherein the application program may have access to the results.

As indicated above, the user typically initiates a remote request by embedding a program statement in the application program. The program statement may invoke a utility, and may pass selected parameters to the utility. The selected parameters preferably indicate the desired action to be performed on the second computer platform. The desired action preferably starts or controls an application program resident on the second computer platform and/or accesses and receives data from a memory storage device resident on the second computer platform.

Preferably, the utility transforms the request into a format that is expected by the second computer platform. The expected format may be the format provided by a local terminal that may be connected to the second computer platform.

The utility then may provide the request to the interface that interconnects the first and second computer platforms, where it is transferred across the interface to the second computer platform. The second computer platform then responds to the request just as if the request originated from a local terminal.

If the request initiates execution of an application program, any resulting data may be transferred back across platform interconnection to the first computer platforms. The utility may receive the resulting data and write the data into a buffer. Thereafter, the buffer is preferably accessible by the application program running on the first computer platform. The buffer may be specified by the user in the original program statement which invokes the utility. The application program may then perform any additional analysis or formatting of the data stored in the buffer.

It is contemplated that the present invention may provide communication between autonomous application programs, each resident on a heterogeneous computer platform, as well as distributed application programs, wherein each portion of the distributed application program is resident on a heterogeneous computer platform.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
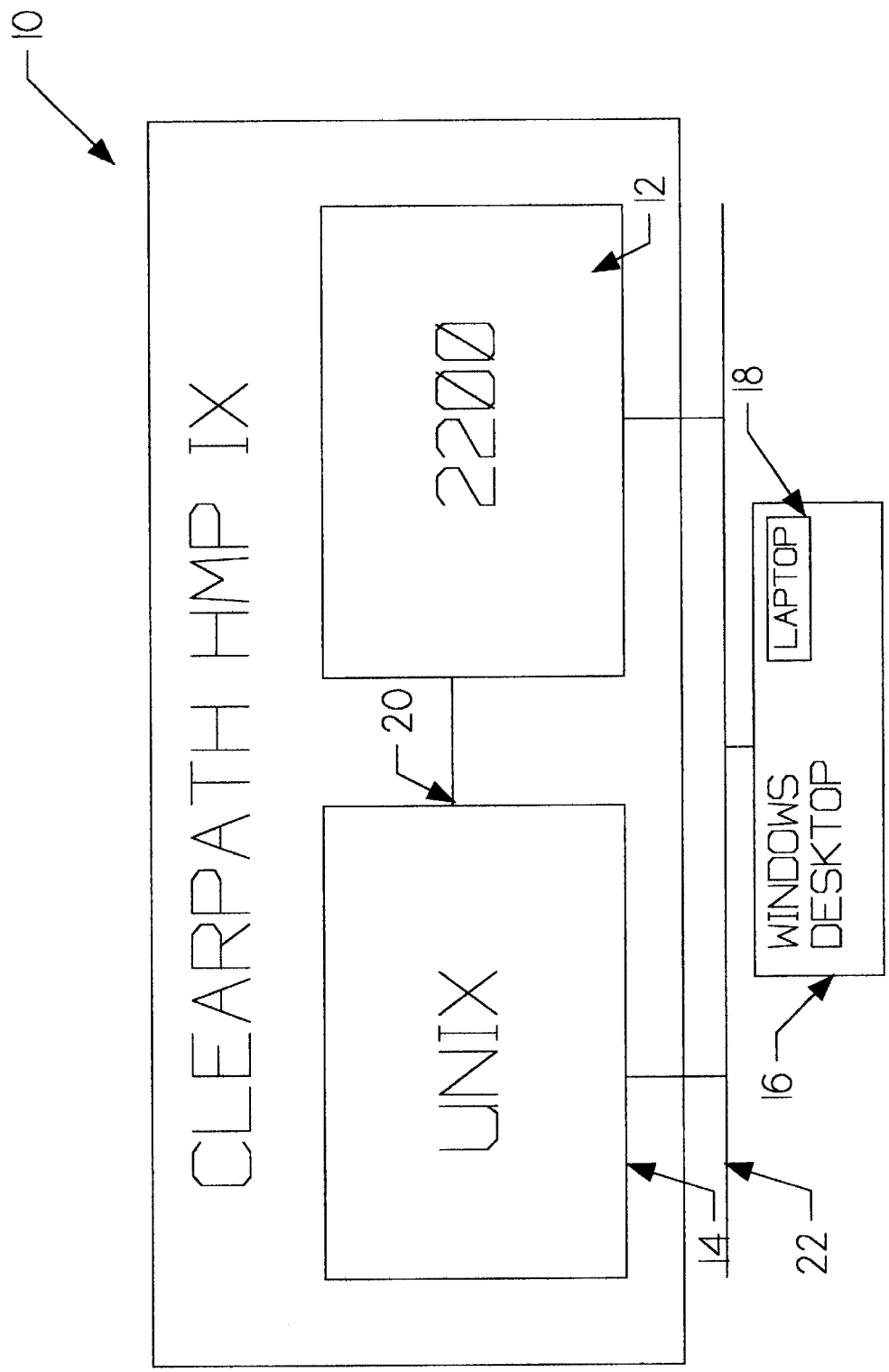
FIG. 1 is a block diagram of the hardware configuration of the preferred embodiment.

FIG. 1 is a block diagram showing the basic hardware components of the preferred embodiment. In accordance with the CLEARPATH HMP IX system 10, commercially available from Unisys Corporation, 2200 platform 12 and UNIX platform 14 are provided with large scale mainframe hardware, also commercially available from Unisys Corporation. Industry compatible desktop computer 16 and laptop computer 18 provide the WINDOWS 95 interface to the remainder of the system. 2200 platform 12 is coupled to UNIX platform 14 via internal local area network (LAN) 20. 2200 platform 12 and UNIX platform 14 couple to desktop computer 16 and laptop computer 18 via external LAN 22. These hardware and software elements, along with supporting documentation, are incorporated herein by reference.

Figure 2:
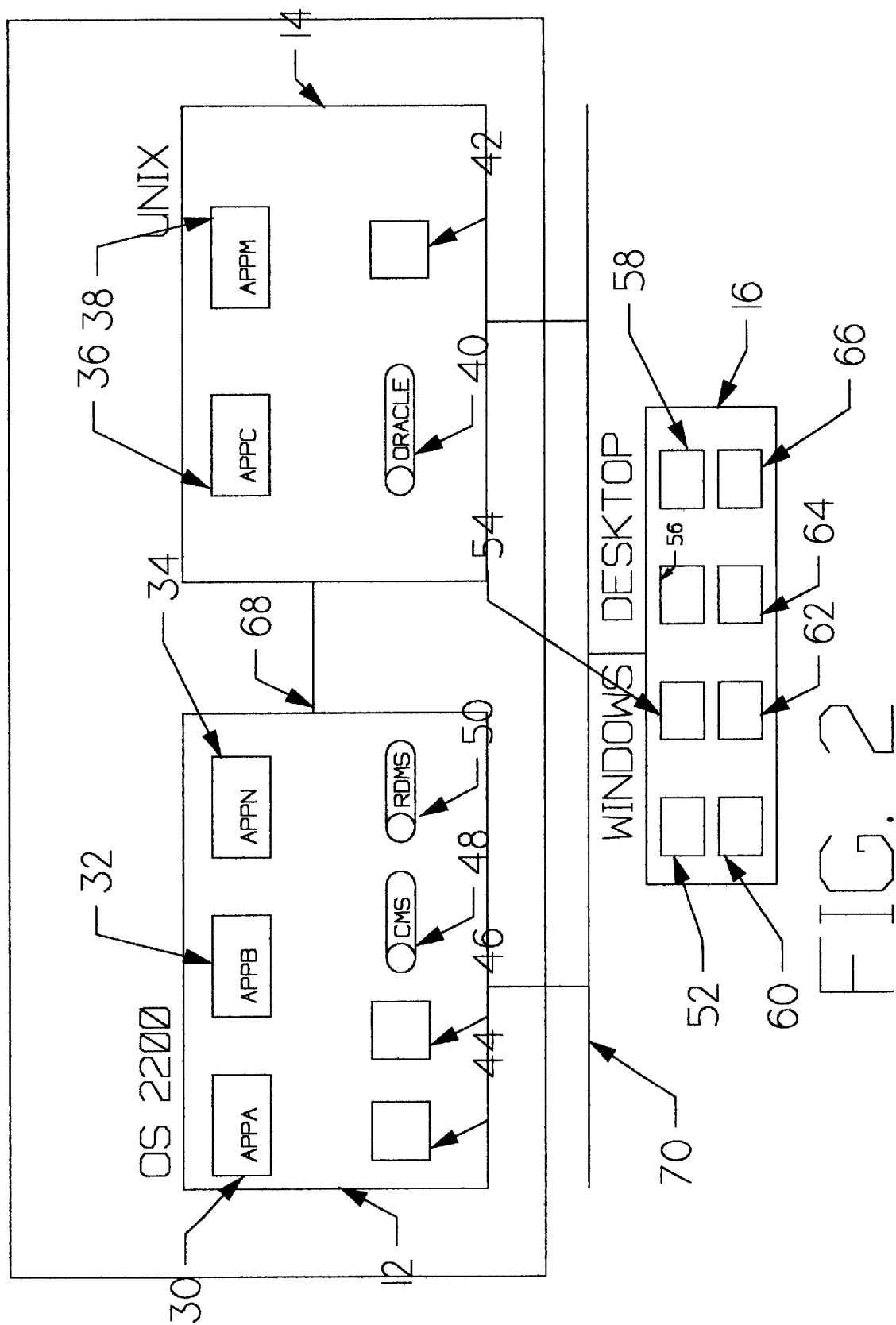
FIG. 2 is a block diagram of the software configuration of the preferred embodiment.

FIG. 2 is a schematic view of the various software elements of the preferred embodiment showing access by the user of the WINDOWS 95 based industry compatible personal computer to the large scale mainframe system elements. The function represented by icons 52, 54, 56, 58, 60, 62, 64 and 66 permit the user to directly call upon the mainframe functions using the CLEARPATH HMP IX system.

OS 2200 controls application 30, application 32, and application 34, along with the database management and communication capabilities of OS 2200 DBS 48 and RDMS 50. Also available, and shown schematically, are the OS 2200 file handling functions 44 and report generation functions 46. 2200 platform 12 is coupled to terminal 72 and terminal 74.

Similarly, UNIX controls application 36, application 38, oracle database manager 40, and the UNIX file management functions 42. OS 2200 platform 12 is coupled to UNIX platform 14 via internal LAN 68. OS 2200 platform 12 and UNIX platform 14 are coupled to desktop computer 16 via external LAN 70. The user at the industry compatible computer platform has direct access to all of these functions utilizing commercially available diverse system elements, which are herein incorporated by reference along with corresponding supporting documentation.

Figure 3:
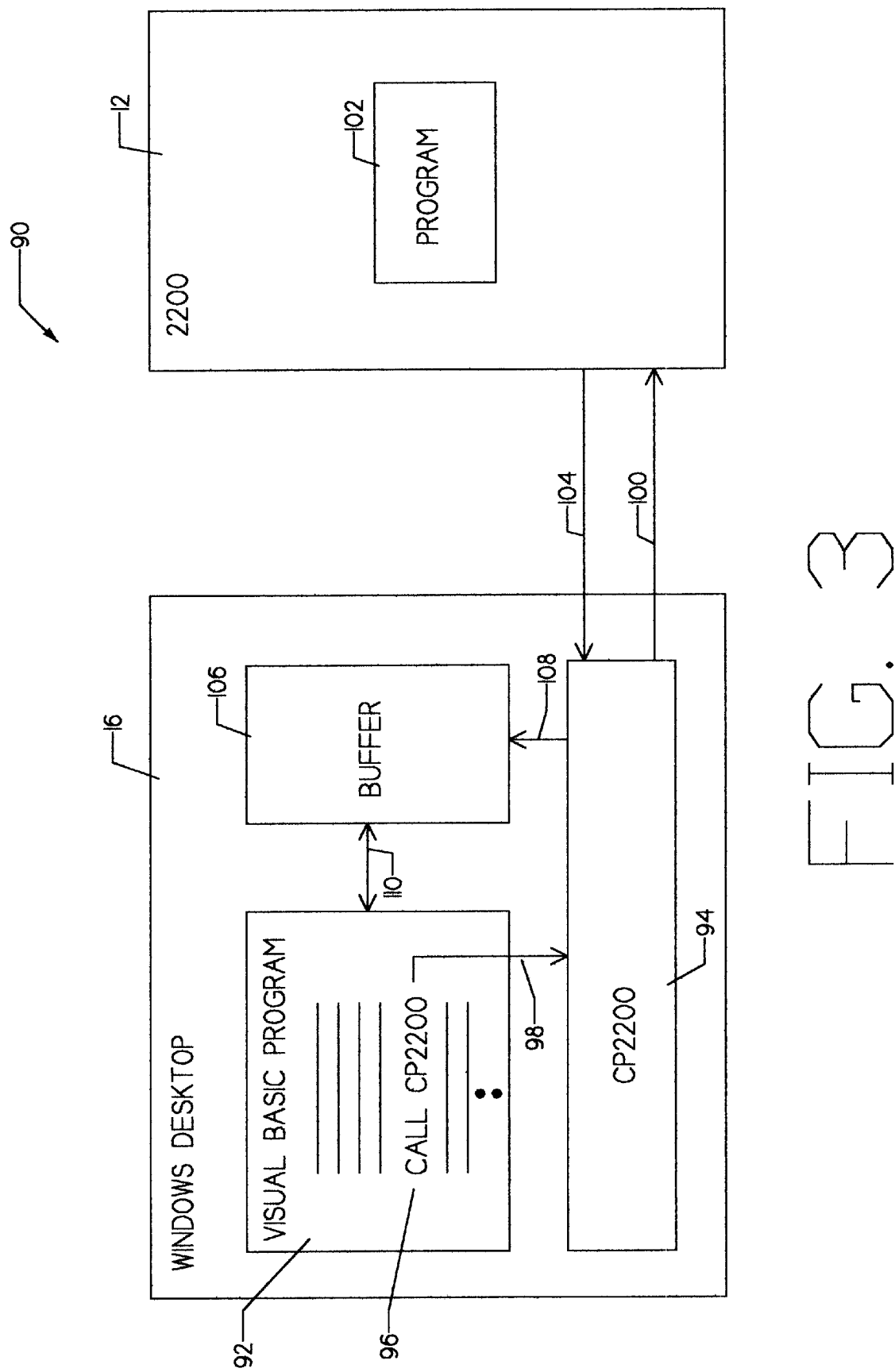
FIG. 3 is a block diagram of the preferred embodiment of the present invention.

FIG. 3 is a block diagram of the preferred embodiment of the present invention. The preferred embodiment is an automation server or utility that is coupled to at least two different machines or platforms that are interconnected. For example, desktop computer 16 may be coupled to 2200 platform 12 and/or UNIX platform 14. Likewise, UNIX platform 14 may be coupled to 2200 platform 12 and desktop computer 16. The inner connection is achieved using LAN 68 and LAN 70, which may be any connection including a standard fiber optics network connection.

The preferred embodiment allows the user to move data from one platform to the next and to design programs that execute across multiple platforms. Thus, the preferred embodiment helps users to easily write programs on desktop computer 16 or UNIX platform 14 which can invoke, control and/or receive data from remote application programs running on the 2200 platform 12.

In the illustrative embodiment, desktop computer 16 executes a visual basic program 92. Visual basic program 92 initiates a call to CP 2200 automation server 94 by embedding a "CALL CP 2200" statement in the visual basic program 92. The CALL CP 2200 program statement is shown at 96. CALL CP 2200 96 invokes the CP 2200 automation server 94 via path 98 and includes parameters which indicate the desired action to be performed on 2200 platform 12. These actions may include starting a 2200 run or executing a predetermined 2200 program.

Once the call is received by CP 2200 automation server 94, the request is reformatted into the format expected by 2200 platform 12. The format typically expected by 2200 platform 12 is the same format received from a terminal, such as terminal 72 or terminal 74 (see FIG. 2).

CP 2200 automation server 94 then transfers the formatted request to 2200 platform 12 via interface 100, which may correspond to LAN 70 of FIG. 2. 2200 platform 12 responds to the request just as if the request originated from a terminal such as terminal 72 or terminal 74.

If 2200 platform 12 executes program 102 in response to the request, any resulting data is transferred across interface 104 to CP 2200 automation server 94. The request sent to 2200 platform 12 via interface 100 from CP 2200 automation server 94 may be any request which may be input via terminal 72 or terminal 74 to invoke control 2200 platform 12.

The data transferred back to CP 2200 automation server 94 via interface 104 is written into buffer 106 via interface 108. Buffer 10.6 is accessible by visual basic program 92 via program interface 110. Buffer 106 is preferably specified in the "CALL CP 2200" statement in the visual basic program 92 so that the visual basic program 92 may identify the data stored in buffer 106.

Another example is a utility that performs a telnet (CPTELNET) from within a visual basic application on the desktop computer to a UNIX system. This utility operates similar to the above-described embodiment.

Figure 4:
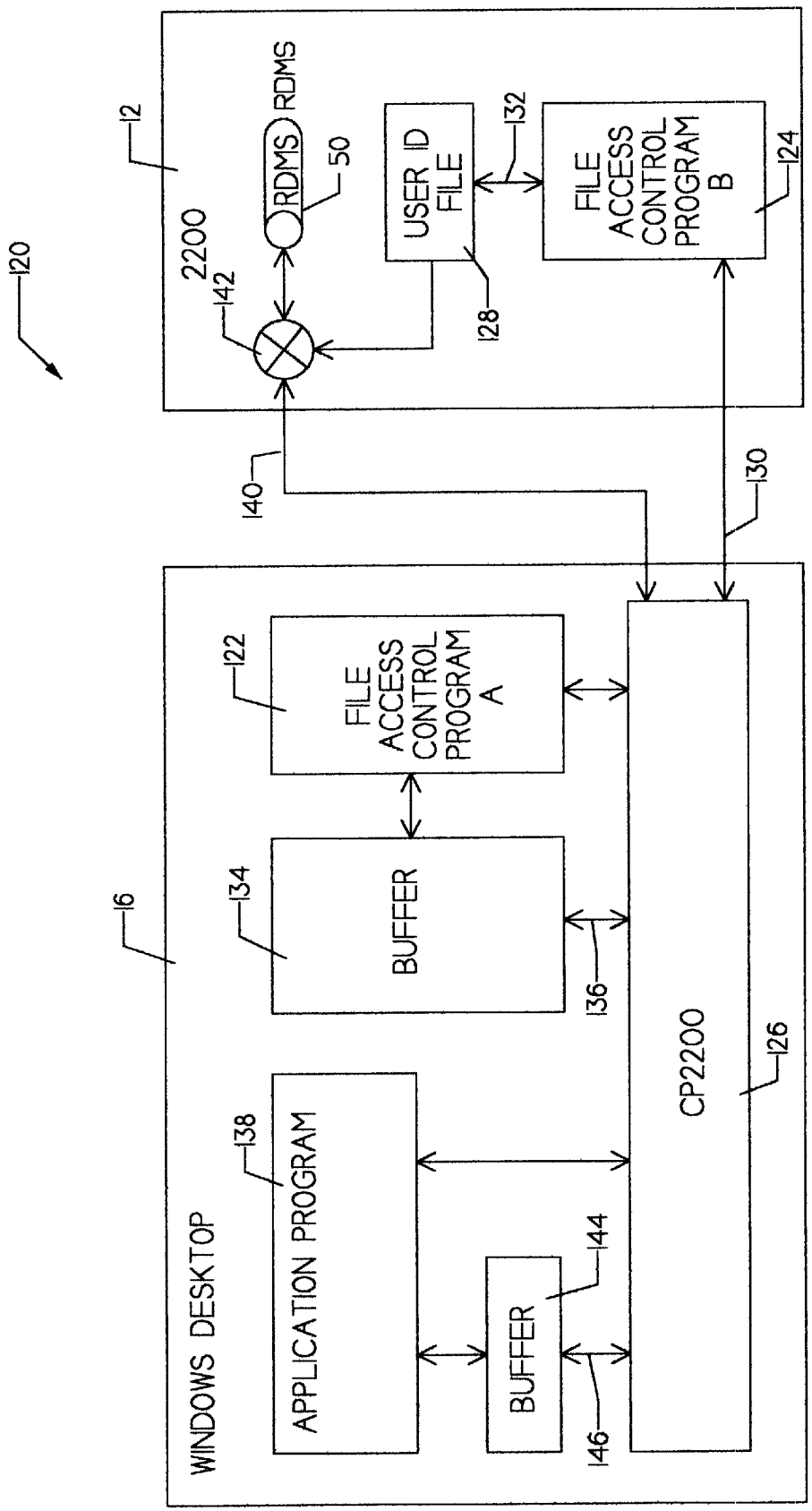
FIG. 4 is an application of the preferred embodiment of the present invention.

FIG. 4 is an illustrative application of the preferred embodiment shown in FIG. 3. The illustrative application is shown generally at 120. In FIG. 3, once data has been transferred from 2200 platform 12 to buffer 106 via CP 2200 automation server 94, it may be formatted to correspond to a user specified file format. For example, the format could be in an EXCEL spreadsheet file format, an ACCESS DB database file format, or some other file format.

Once the data is present, buffer 106 is accessible by the visual basic program 92, or any other program-or interface to desktop computer 16. In this illustrative embodiment, the user may be allowed to change the data and write the data back to 2200 platform 12. For example, the data may be in an EXCEL spreadsheet file format, and a user may modify the data in the EXCEL spreadsheet.

It is recognized that the type of data that may be available to a particular user, and the type of operations that may be performed on the data may be determined by the user's privileges which are associated with the user's 2200 platform 12 user ID. Thus, before a user can transfer data from 2200 platform 12 to desktop computer 16, the user must have a valid user ID on 2200 platform 12. A system administrator can create a new user ID or modify an exiting user ID by logging onto 2200 platform 12 and editing the appropriate file.

In the illustrative application shown in FIG. 4, a file access control program (UAUSER) allows these functions to be performed from desktop computer 16. The file access control program is used to change or modify a user ID from a desktop computer. A first portion 122 of a file access control program is resident on desktop computer 16. A second portion 124 of the file access control program is resident on 2200 platform 12. File access control program A 122 may utilize CP 2200 automation server 126 to download user ID file 128. CP 2200 automation server 126 may be coupled to file access control program B 124 via interface 130, which may correspond to LAN 70. File access control program B 124 accesses the contents of user ID file 128 via interface 132.

The user ID file 128 contents are downloaded to CP 2200 automation server 126 via file access control program B and interface 130 and are stored in buffer 134 via interface 136. Once the user ID file contents are stored in buffer 134, file access control program A 122 can be used by the user to modify the user ID information.

The information can be modified to include the type of database accesses that the user is allowed to make, which may include read only access versus write access, as well as the name and revision of the database the user is allowed to access. Other information may include the contents of the database the user is allowed access (e.g., production versus task). The contents of buffer 134 may also be modified by file access control program A 122 to include new user IDs or to delete old user IDs.

When all modifications are complete, the contents of buffer 134 are saved and are written back to file access control program B 124 via CP 2200 automation server 126. User ID file 128 is then upgraded with the new results via interface 132. Once user ID file 128 has been updated, application 138, which may correspond to a visual basic program 92, may access RDMS 50 through CP 2200 automation server 126 via interface 140. Interface 140 may correspond to LAN 70. The level of access of application 138 to RDMS 50 is determined by user ID file 128 and control 142. If the level of access of application 138 to RDMS 50, or any other database within 2200 platform 12 needs to be changed, file access control program A 122 can again download the contents of user ID file 128 to change the level of access for each user as desired. Once application 138 accesses RDMS 50, the contents of any desired database may be downloaded via interface 140 to CP 2200 126 into buffer 144 via interface 146. Access to the information in buffer 144 is determined by the particular user's level of access as specified within user ID file 128.

Figure 5:
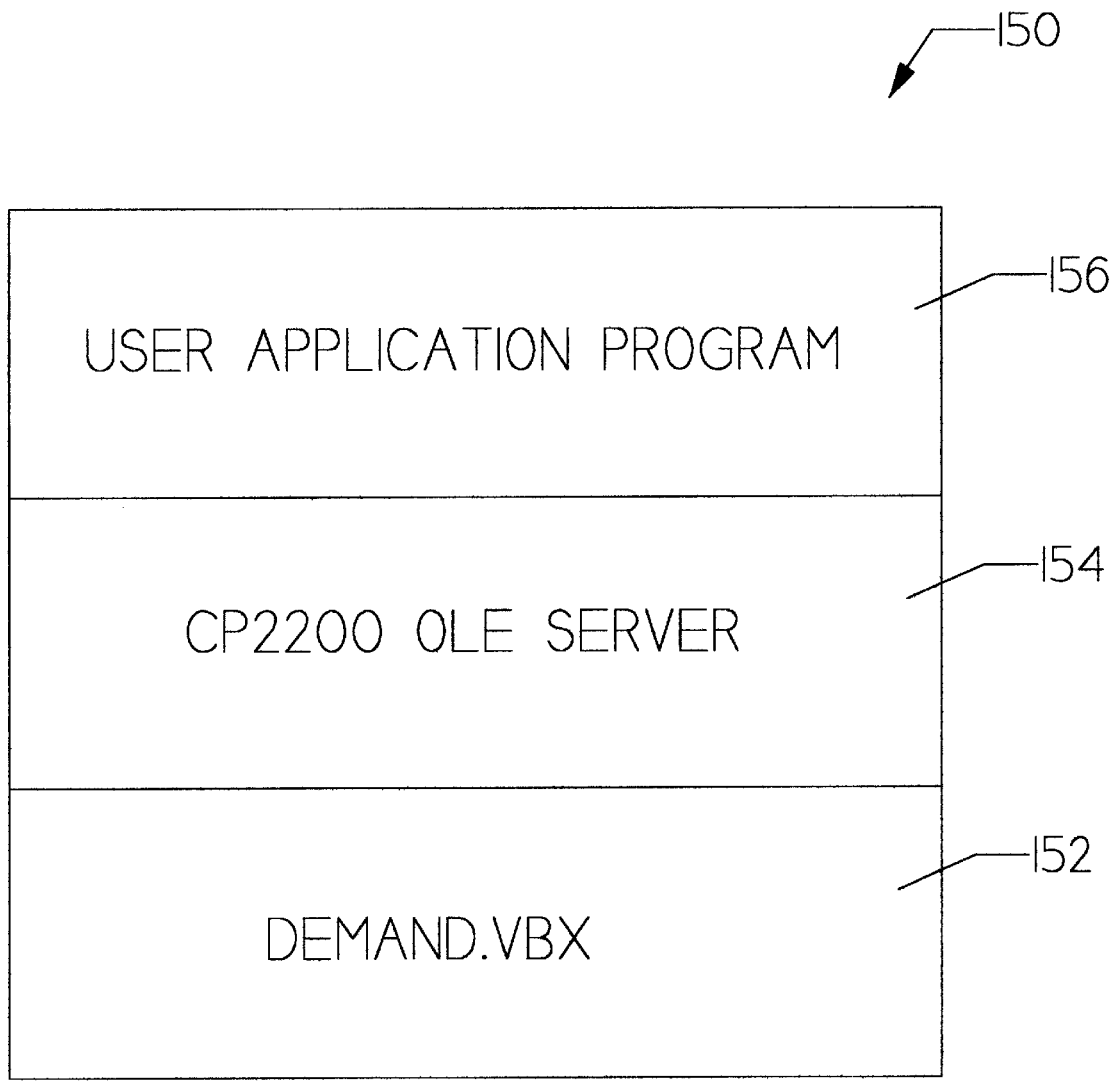
FIG. 5 is an illustration of the preferred embodiment of the present invention.

FIG. 5 shows an illustration of the preferred embodiment of the present invention. The preferred embodiment is shown generally at 150 which shows the layers of code comprising the preferred embodiment. CP 2200 automation server is a utility that provides line mode demand interface to 2200 platform 12. The lower layer of code is the DEMAND.VBX which is written in the C language. DEMAND.VBX is an insertable object which may be called from a visual basic program to provide a "CANNED" TELNET interface for the calling program. DEMAND.VBX hides all communication specific functionality from the calling program so that a programmer requires no knowledge of communication protocol to add a TELNET interface to a visual basic program when making a call to DEMAND. VBX using the specific call format (e.g., call CP 2200 96, previously discussed in FIG. 3).

Another layer of code on top of DEMAND.VBX is CP 2200 OLE server 154, which makes the code more user friendly. This code is a visual basic program written using object linking and embedding "OLE" technology provided by the MicroSoft Corporation. This OLE object can be referred to as an "OLE server". Adding CP 2200 OLE server 154 as a second layer of code on top of DEMAND.VBX 152 hides the interfaces from the calling application program so that changes made to DEMAND.VBX will not affect the calling applications program. In addition, the DEMAND. VBX code must be called from a visual basic program where OLE servers can be called by any program capable of calling OLE servers, regardless of the language in which they are coded. Thus, DEMAND.VBX via the OLE server makes the functionality embedded and DEMAND.VBX available to more users. CP 2200 OLE server 154 is included in the PATHMATE directory and is registered in the WINDOWS registry, making it available to be called by any application capable of calling an OLE server.

PATHMATE is an assistance program which is defined in the co-pending applications "Operator Assistance for Heterogeneous Data Processing Systems" and "Operator Assistance for Data Processing Systems", which have been incorporated herein by reference.

The highest layer of code is user application program 156 which interfaces with the preferred embodiment of the present invention. As an example, user application program 156 may log into, and then send and/or receive character strings from 2200 platform 12.

Figure 6A:
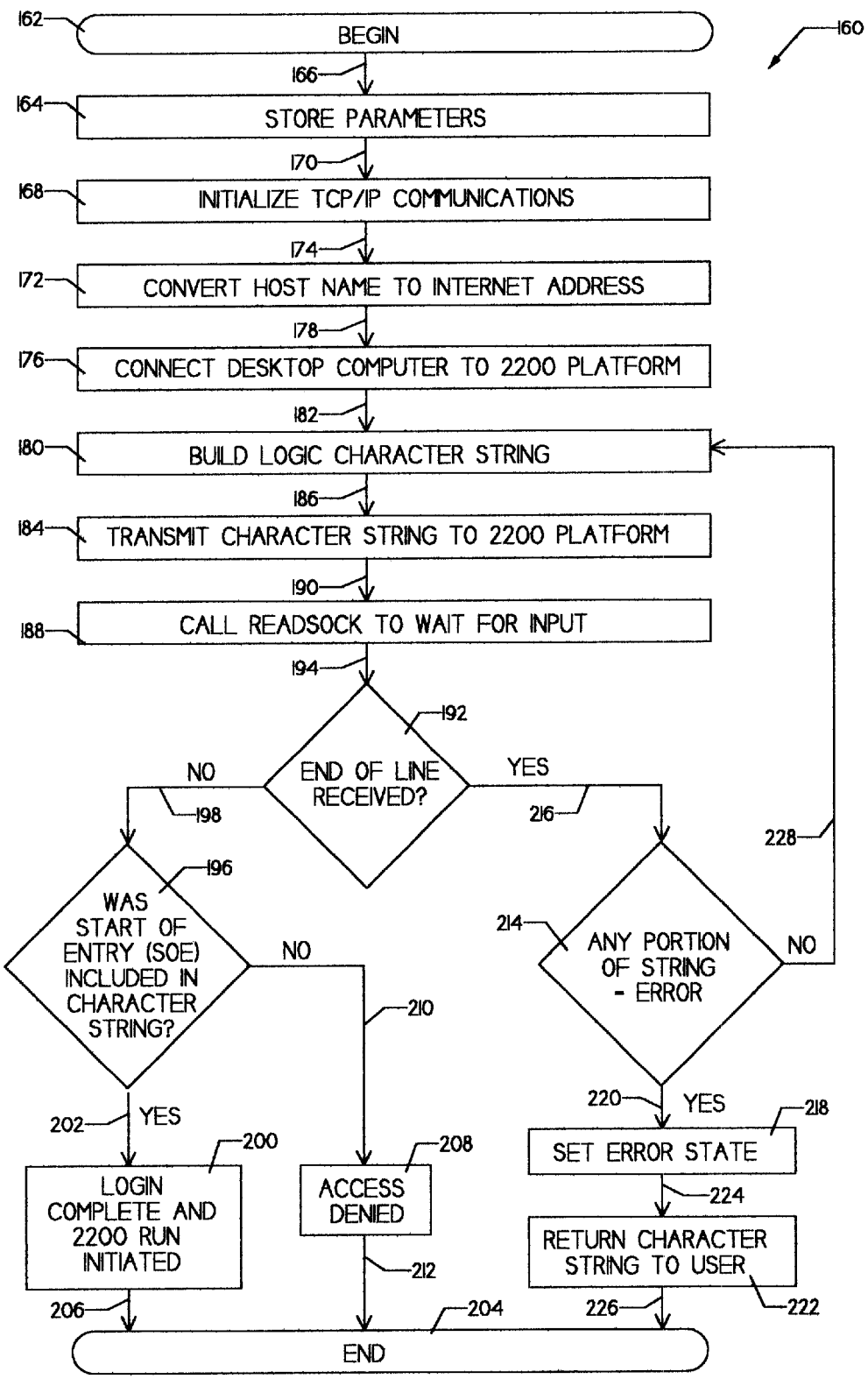
FIG. 6A is a flow diagram showing the lowest layer of code in a preferred method of the present invention.

FIG. 6A is a flow diagram showing the lowest layer of code in a preferred method of the present invention. DEMAND.VBX accepts character strings as input parameters. These strings may be transmitted to 2200 platform 12 using the TELNET handshaking protocol. Before any character strings may be transferred to 2200 platform 12, a login process must typically be performed. The login process involves transferring special purpose user ID, password, account number and run card strings. This information is provided as input parameters when the calling program calls DEMAND.VBX with the login function. If a user attempts to send characters without connecting to 2200 platform 12, an error is returned indicating that a 2200 platform 12 connection has not yet been established.

The flow diagram showing the login function is shown generally at 160. The flow diagram is entered at element 162, and control is passed to element 164 via interface 166. Element 164 stores the parameters passed by the calling program into a buffer accessible by DEMAND.VBX. Control is then passed to element 168 via interface 170. Element 170 initializes TCP/IP communications. Control is then passed to element 172 via interface 174. Element 172 converts the host name (e.g., 2200 platform 12) to an internet address. Control is then passed to element 176 via interface 178.

Element 176 connects desktop computer 16 to 2200 platform 12 (see also, FIG. 3). Control is then passed to element 180 via interface 182. Element 180 builds the next string of login parameters for 2200 platform 12. The login parameters include host name, user ID, password, run ID, account and project name. Control is then passed to element 184 via interface 186. Element 184 transmits the character string to 2200 platform 12. Control is then passed to element 188 via interface 190. Element 188 is a call to READSOCK to wait for a response. READSOCK is a Unisys application program defined in FIG. 6B.

Control is then passed to decisional element 192 via interface 194. Decisional element 192 determines whether an end of line was received from element 188. If an end of the line was not received, control is passed to decisional element 196 via interface 198 for determination whether a "start of entry" was included in the character string received from element 188. If "start of entry" was received in the character string received from element 188, control is passed to element 200 via interface 202. At element 200, the login is complete and the 2200 platform 12 run is initiated. Control is then passed to element 204 via interface 206, wherein the algorithm is exited.

If the "start of entry" was not included in the character string received from element 188, control is passed to element 208 via interface 210. Element 208 indicates that access was denied. Control is then passed to element 204 via interface 212, wherein the algorithm is exited.

If the "end of line" was received from element 188, control is passed to decisional element 214 via interface 216. Decisional element 214 determines if any portion of the character string received from element 188 is in error. If any portion of the character string received from element 188 is in error, control is passed to element 218 via interface 220. Element 218 sets an error state and passes control to element 222 via interface 224. Element 222 returns the character string to the user and passes control to element 204 via interface 226, wherein the method is exited.

If element 214 determines that any portion of the character string is not in error, control is passed back to element 180 via interface 228.

Figure 6B:
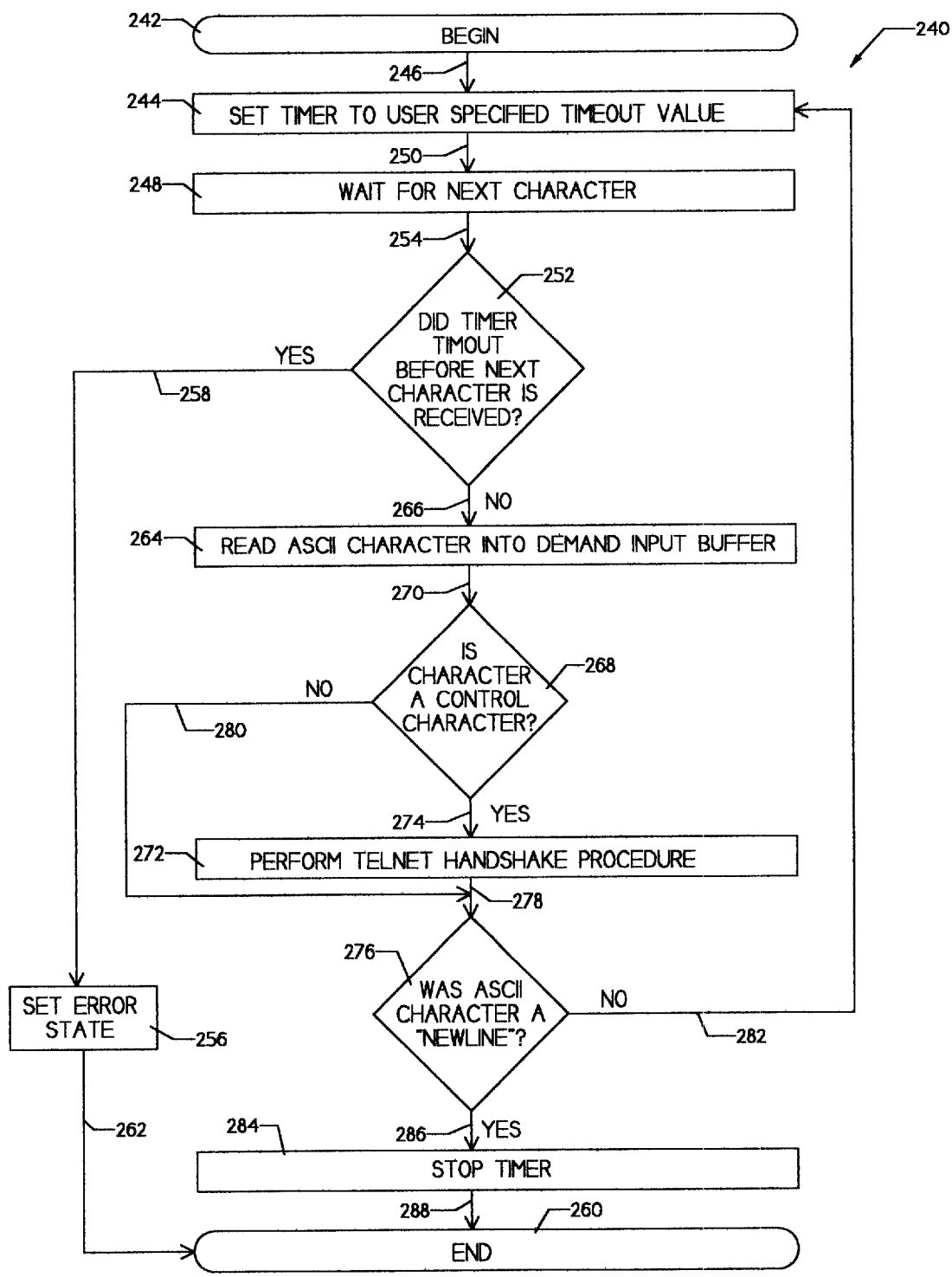
FIG. 6B is a flow diagram showing the lowest layer of code which performs the handshake procedure to access a computer platform in a preferred method of the present invention.

FIG. 6B is a flow diagram showing the lowest layer of code which performs the handshake procedure to access a computer platform in a preferred method of the present invention. The method is generally shown at 240 and is implemented by the Unisys READSOCK application. The Unisys READSOCK application performs the TELNET handshaking protocol, and thus initiates communication between desktop computer 16 and 2200 platform 12.

The flow diagram is entered at element 242, wherein control is passed to element 244 via interface 246. Element 244 sets a timer to a user specified time out value. The time out value is set to denote the maximum time to wait for the next character to be transmitted from 2200 platform 12. Control is then passed to element 248 via interface 250.

Element 248 waits for the next character. Control is then passed to decisional element 252 via interface 254. Decisional element 252 determines if the timer timed out before the next character was received. If the timer did time out before the next character was received, control is passed to element 256 via interface 258. Element 256 sets an error state to indicate that the timer reached a time out state. Element 256 then passes control to element 260 via interface 262, wherein the method is exited.

If the timer did not time out before the next character was received, element 252 passes control to element 264 via interface 266. Element 264 reads the ASCII character into a DEMAND.VBX input buffer. Control is then passed to decisional element 268 via interface 270. Element 268 determines if the character received by element 248 was a control character. If the character received by element 248 was a control character, control is then passed to element 272 via interface 274. Element 272 then performs the TELNET handshake procedure to initiate communications with 2200 platform 12. Element 272 then passes control to decisional element 276 via interface 278. If element 268 determines that the character received was not a control character, control is then passed to decisional element 276 via interface 280.

Decisional element 276 determines if the ASCII character was a "new line" character. If the ASCII character was not a new line character, control is passed back to element 244 via interface 282. If the ASCII character was a new line character, control is passed to element 284 via interface 286. That is, control is passed to element 284 when the TELNET handshake procedure performed by element 272 was successful. Element 284 stops the timer, and passes control to element 260 via interface 288, wherein the method is exited.

Figure 7A:
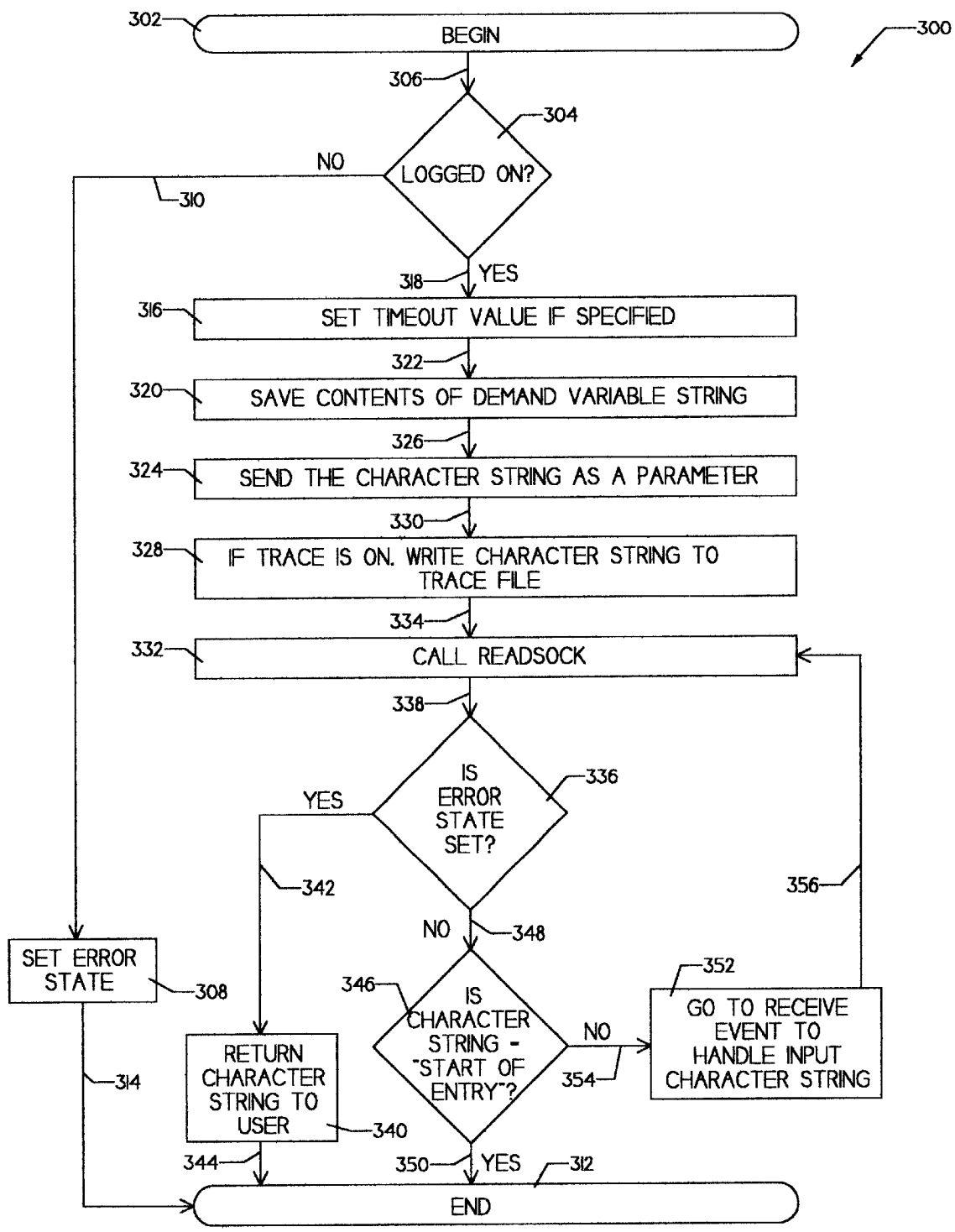
FIG. 7A is a flow diagram showing the lowest layer of code which performs the communication to the computer platform in a preferred method of the present invention.

FIG. 7A is a flow diagram showing the lowest layer of code which performs the communication with the computer platform in a preferred method of the present invention. The diagram is generally shown at 300. The flow diagram is entered at element 302, wherein control is passed to element 304 via interface 306. Element 304 determines if the user is logged on to 2200 platform 12. If the user is not logged on to 2200 platform 12, control is passed to element 308 via interface 310. Element 308 sets an error state and passes control to element 312 via interface 314, wherein the method is exited.

If the user is logged on, a message is sent to 2200 platform 12 as indicated by the subsequent method steps. Decisional element 304, and after determining that the user is logged on, passes control to element 316 via interface 318. Element 316 sets the time out value if specified. Element 316 then passes control to element 320 via interface 322. Element 320 saves the contents of the DEMAND.VBX variable string, which DEMAND.VBX has accepted as input parameters. These strings will ultimately be transmitted to 2200 platform 12. Control is then passed to element 324 via interface 326. Element 324 passes a character string as a parameter to 2200 platform 12. Control is then passed to element 328 via interface 330. Element 328 writes the character string to a trace file if the trace option has been selected in order to save the character string. Control is then passed to element 332 via interface 334.

Element 332 calls the READSOCK application discussed previously in FIG. 6B. READSOCK determines if the timer timed out before the next character was received, and if so, sets the error state (see also, FIG. 6B). Control is then passed to decisional element 336 via interface 338. Decisional element 336 determines if the error state was set by READSOCK (see also, FIG. 6B). If the error state was set, the timer did time out before the next character string was received, and control is passed to element 340 via interface 342. Element 340 returns the character string to the user before passing control to element 312 via interface 344, wherein the method is exited.

If the error state was not set, READSOCK reads the ASCII character into the DEMAND.VBX input buffer, and control is passed to decisional element 346 via interface 348. Decisional element 346 determines if the character string read by element 322 is equal to "start of entry". 2200 platform 12 returns a "start of entry" character to indicate that 2200 platform 12 is ready to receive more character strings. If the character string received by element 332 was equal to "start of entry", control is passed to element 312 via interface 350, wherein the method is exited.

If element 346 determines that the character string was not equal to "start of entry", control is passed to element 352 via interface 354. Element 352 is a call to RECEIVE EVENT, which handles the input character string. The RECEIVE EVENT program is discussed in FIG. 7B. Element 352 then passes control to element 332 via interface 356 so that the READSOCK application may be called again. This cycle is repeated until decisional element 346 determines that the character string equals "start of entry" or decisional element 336 determines that the error state set by element 256 of FIG. 6B is set.

Figure 7B:
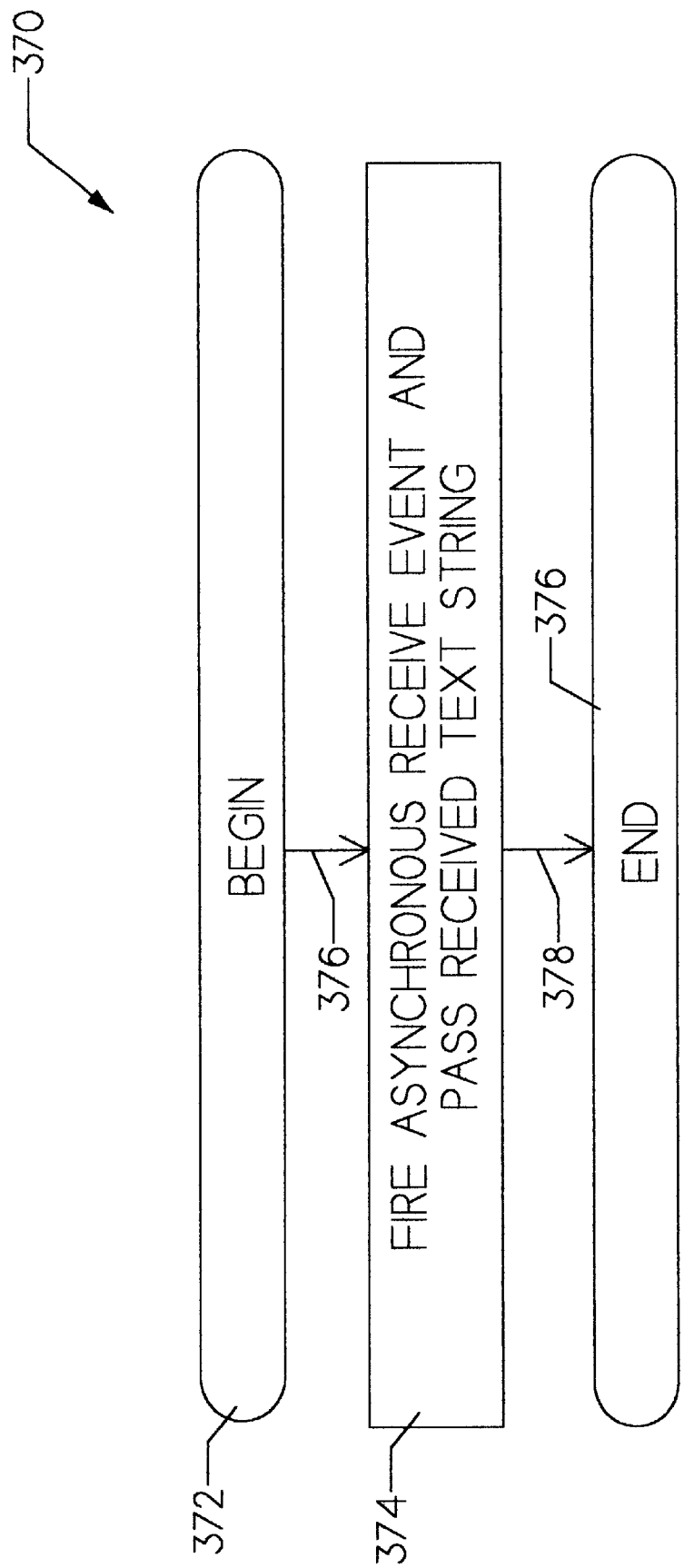
FIG. 7B is a flow diagram showing the lowest layer of code which receives an event from the computer platform in a preferred method of the present invention.

FIG. 7B is a flow diagram showing the lowest layer of code which receives an event from the computer platform in a preferred method of the present invention. The diagram is generally shown at 370, and is the RECEIVE EVENT program called from element 352 in FIG. 7A. The flow diagram is entered at element 372 wherein control is passed to element 374 via interface 376. Element 374 "fires" the a synchronous RECEIVE EVENT, and passes the received text string to the calling program. Element 374 then passes control to element 376 via interface 378, wherein the method is exited.

Figure 8:
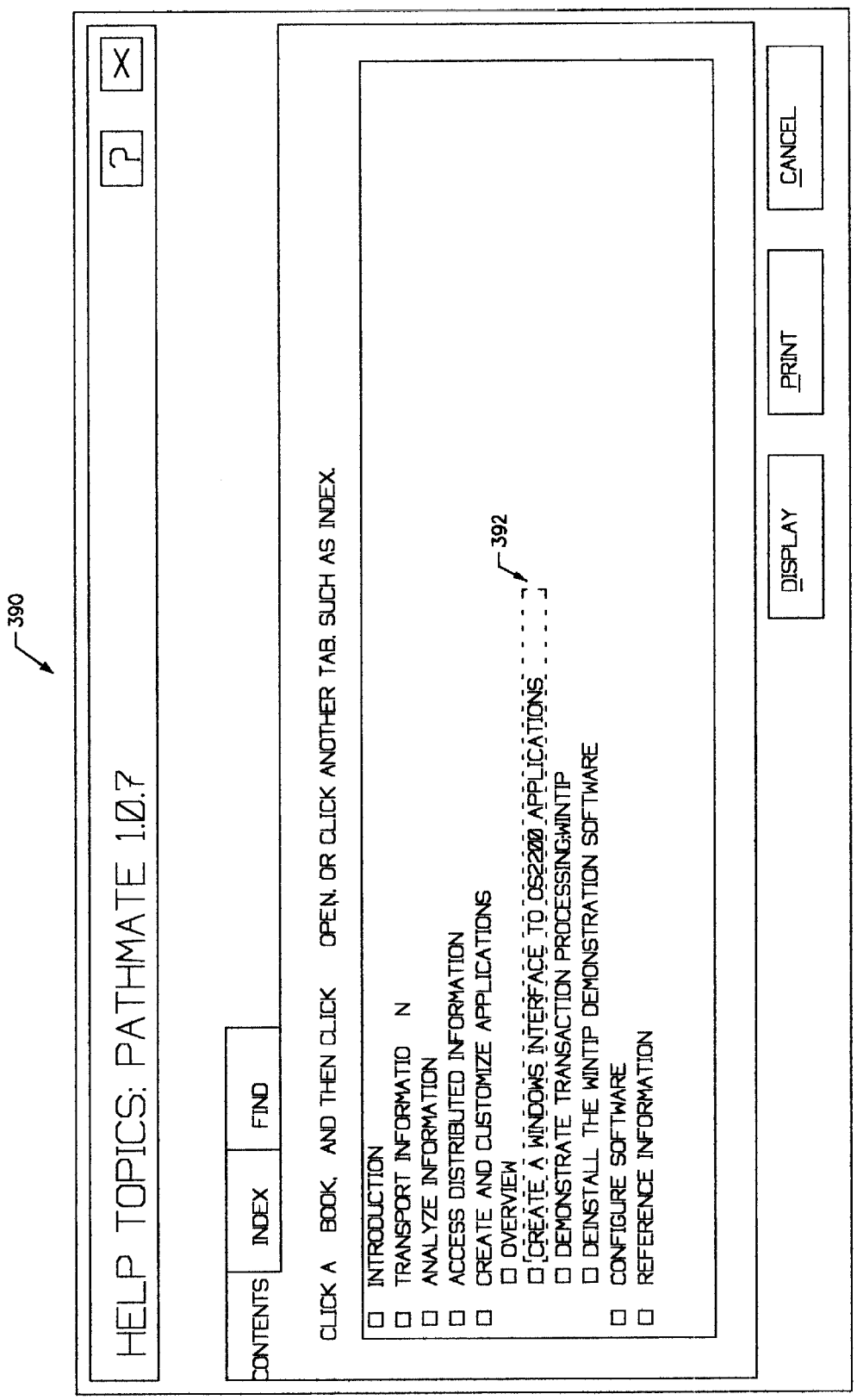
FIG. 8 is a view of a screen of PATHMATE showing entry into the CP2200 DEMAND session.

FIG. 8 is a view of a screen of the PATHMATE system to call a DEMAND.VBX. As assessed above, the DEMAND code is contained in the .VBX file and provides a control function. The control function is an insertable object which may be provided into a visual basic program (see e.g., MicroSoft Programmer's Guide). The DEMAND.VBX interface passes data between a visual basic program and a 2200 demand session. PATHMATE provides a ready made program that calls DEMAND.VBX for the user, and the program is coded as a visual basic OLE server called "CP 2200 DEMAND SESSION". This code receives variables from the user application program and passes them, in the correct format, to the DEMAND session. The character strings are then passed back from DEMAND to the calling program in a format that conforms with OLE design rules.

FIG. 8 shows the PATHMATE window at 390 which creates a windows interface to OS 2200 applications. To create the windows interface, line 392 is highlighted as shown. Establishing this interface permits the user to interact with 2200 platform 12 via desktop computer 16. The CP 2200 DEMAND SESSION acts like an OS 2200 demand session that is programmed from an application (see also, FIG. 3).

A session is opened by logging on with the user ID, password, run ID, etc. Commands may be sent and responses received from 2200 platform 12. In addition, commands may be executed, processes and utilities may be executed, and data may be sent and received using the subsequent PATHMATE windows.

Figure 9:
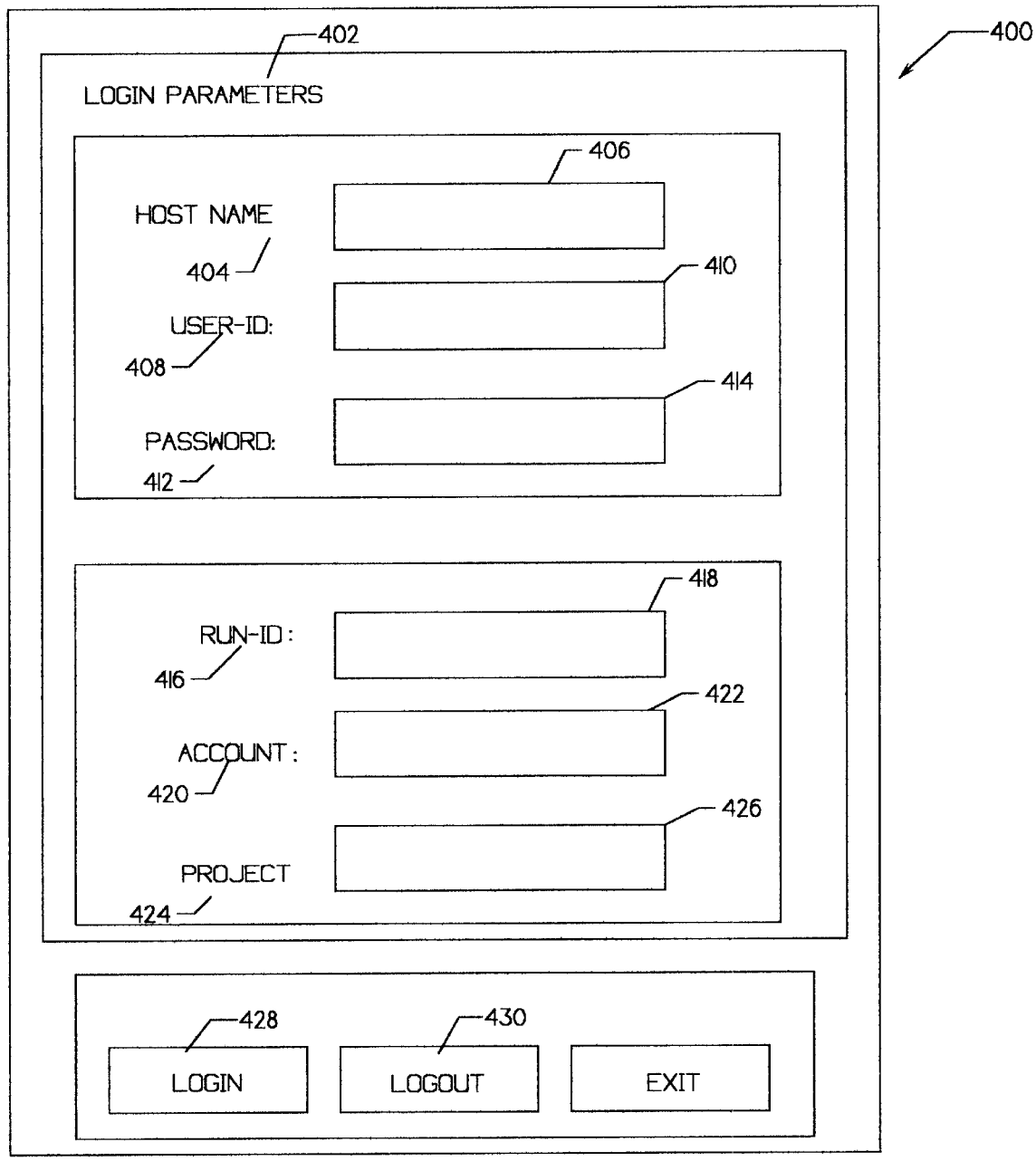
FIG. 9 is a view of an illustrative screen for initiating communication with the computer platform.

FIG. 9 is a view of an illustrative screen for initiating communication with a remote computer platform. The window shown at 400 indicates a request for login parameters at 402. A host name is requested at 404 and the user response is entered at 406. A user ID is requested at 408 and the user response is entered at 410. A password is requested at 412 and the user response is entered at 414.

A run ID is requested at 416 and the user response is entered at 418. An account name is requested at 420 and the user response is entered at 422. A project identifier is requested at 424 and the user response is entered at 426. Window 400 provides a defined form using visual basic.

Each of the login parameters which are requested within this form are associated with a defined text field. When the ASCII text is input to these fields and the login icon at 428 is selected, the ASCII strings are assigned to string variables which are passed to the login function previously described in FIG. 6A. The log out icon shown at 430 allows the user to terminate the CP 2200 DEMAND SESSION.

Figure 10:
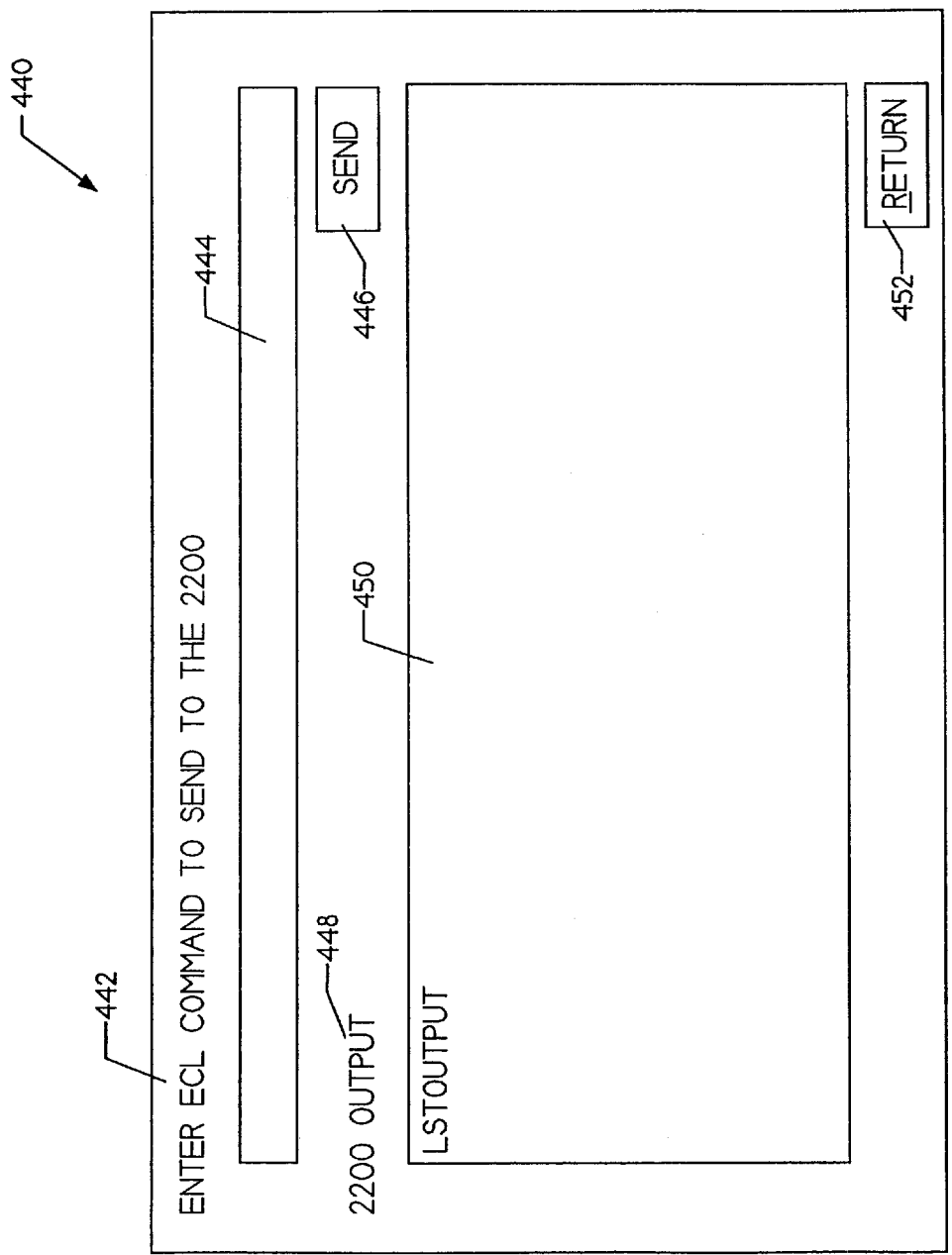
FIG. 10 is a view of an illustrative screen for sending and receiving communication with a remote computer platform.

FIG. 10 is a view of an illustrative screen for sending and receiving communication with a remote computer platform. Window 440 shows the user windows for sending and receiving character strings to 2200 platform 12. A request for entering ECL command to send to the 2200 is shown at 442. The user enters the command at 444. Once the command is entered, the user clicks on the send icon at 446 and the command is sent to the 2200 platform 12. The 2200 output is indicated at window 448. The response from 2200 platform 12 is received by window 450 once the user selects the return icon at 452.

Having thus described the preferred embodiments of the present invention, those of skill in the art will readily appreciate that the teachings found herein may be applied to yet other embodiments within the scope of the claims hereto attached.

What is claimed is:

1. In a data processing system having a first application program resident on a first computer platform, and further having a second computer platform coupled to the first computer platform, the improvement comprising:
   a. utility call provided in the first application program, said utility call providing a request;
   b. utility means provided in the first computer platform for receiving said utility call, and for providing the corresponding request to the second computer platform wherein said utility means formats the request prior to providing the request to the second computer platform and wherein the second computer platform provides a result in response to the request provided by said utility means; and
   c. wherein said utility means receives the result provided by the second computer platform and wherein said utility means provides the result into a buffer on the first computer platform after receiving the result from the second computer platform.

2. A data processing system according to claim 1 wherein the plurality of computer platforms are heterogeneous.

3. A data processing system according to claim 1 wherein said utility means is itself a computer program that is executed on the first computer platform.

4. A data processing system according to claim 1 wherein the first application program access the results from the buffer.

5. A data processing system according to claim 1 wherein the second computer platform has a second application program thereon.

6. A data processing system according to claim 5 wherein the request executes the second application program.

7. A data processing system according to claim 5 wherein the request controls the execution of the second application program.

8. A data processing system according to claim 5 wherein the request sends data to the second computer platform.

9. A data processing system according to claim 5 wherein the request requests data from the second computer platform.

10. A data processing system according to claim 5 wherein the second application program provides the result.

11. A data processing system according to claim 1 wherein said utility means comprises:

a. request means to receive a request from the first application program;
 b. formatting means coupled to said request means for formatting said request into a format that corresponds to the second computer platform; and
 c. sending means coupled to said formatting means for sending said formatted request to the second computer platform.

12. A data processing system according to claim 11 further comprising receiving means for receiving a result of the second computer platform.

13. A data processing system according to claim 11 wherein the second computer platform has a terminal connected thereto, wherein the terminal provides request to the second computer platform in a terminal format, said formatting means formatting the request in a format that is compatible with the terminal format.

14. A data processing system according to claim 11 wherein said formatting means formats said request into a terminal format, said terminal format corresponding to the another one of the plurality of computer platforms.

15. A data processing system according to claim 11 wherein at least one of the first and second computer platforms is a UNIX-based server.

16. A data processing system according to claim 11 wherein at least one of the first and second computer platforms is a Unisys 2200 mainframe computer.

17. A method for providing communication between one of a plurality of computer platforms and another one or more of the plurality of computer platforms in a data processing system, the method comprising the steps of:

a. receiving a request from one of a number of application programs to communicate with another one of the plurality of computer platforms;
 b. formatting said request into a format corresponding to the another one of the plurality of computer platforms so that said formatted request may be received by the another one of the plurality of computer platforms; and
 c. transferring said formatted request to the another one of the plurality of computer platforms so that the another one of the plurality of computer platforms can process said formatted request.

18. A method according to claim 17 further comprising the step of receiving a result from the another one of the plurality of computer platforms.

19. A method according to claim 17 wherein said result is a user identification file comprising a number of user identifiers and a corresponding number of user identifier attributes, each one of said number of user identifiers corresponding to one of said number of user identifier attributes.

20. A method according to claim 19 wherein said number of user identifier attributes identifies a access level.

21. A method according to claim 20 wherein said access level is read only access.

22. A method according to claim 21 wherein said access level indicates a read access and a write access.

23. A method for providing communication between one of a plurality of heterogeneous computer platforms and another one or more of the plurality of computer platforms in a data processing system, the method comprising the steps of:

a. receiving a program call from one of a number of application programs to communicate with the another one of the plurality of computer platforms, said program call being a statement in said one of said number of application programs to initiate communication with the another one of the plurality of computer platforms, said program call indicating a function to be performed by the another one of the plurality of computer platforms;
 b. formatting said program call into a formatted request having a terminal format corresponding to the another one of the plurality of computer platforms so that said formatted request may be received by the another one of the plurality of computer platforms;
 c. transferring said formatted request to the another one of the plurality of computer platforms so that the another one of the plurality of computer platforms may process said formatted request; and
 d. receiving a result of processing said formatted request from the another one of the plurality of computer platforms.

24. An method according to claim 23 wherein said function is controlling another one of said number of application programs resident on the another one of the plurality of computer platforms.

* * * * *